(12) United States Patent
Holley

(10) Patent No.: US 9,541,066 B2
(45) Date of Patent: Jan. 10, 2017

(54) GENERATION OF RENEWABLE ENERGY FROM MASS AIRFLOW IN UNDERGROUND TUNNELS

(76) Inventor: Norman Holley, Pasadena, CA (US)

(*) Notice: Subject to any disclaimer, the term of this patent is extended or adjusted under 35 U.S.C. 154(b) by 1154 days.

(21) Appl. No.: 13/572,676

(22) Filed: Aug. 12, 2012

(65) Prior Publication Data

US 2013/0039755 A1 Feb. 14, 2013

Related U.S. Application Data

(60) Provisional application No. 61/523,098, filed on Aug. 12, 2011.

(51) Int. Cl.
*F03D 1/02* (2006.01)
*F03D 9/00* (2016.01)

(52) U.S. Cl.
CPC ............... *F03D 9/00* (2013.01); *F03D 1/025* (2013.01); *F05B 2240/9113* (2013.01); *Y02E 10/728* (2013.01)

(58) Field of Classification Search
CPC ............. F03D 9/00; F03D 1/025; F03D 1/02; F03D 11/04; F03D 11/00; F05B 2240/9113; Y02E 10/728; F16C 19/06; F16C 33/32; F16C 19/16; F16C 23/06; F16C 35/06
USPC ................................. 384/490, 492, 445, 456
See application file for complete search history.

(56) References Cited

U.S. PATENT DOCUMENTS

| | | | |
|---|---|---|---|
| 996,309 A | 6/1911 | Carlson | |
| 1,025,929 A | 5/1912 | Snook | |
| 1,266,518 A | 5/1918 | Mulrony | |
| 1,371,836 A | 3/1921 | Antz | |
| 1,504,259 A | 8/1924 | Miller | |
| 3,032,119 A | 5/1962 | Hachmann | |
| 3,942,026 A | 3/1976 | Carter | |
| 3,944,839 A | 3/1976 | Carter | |
| 4,065,225 A | 12/1977 | Allison | |
| 4,087,196 A | 5/1978 | Kronmiller | |

(Continued)

FOREIGN PATENT DOCUMENTS

| EP | 1681462 A2 | 7/2006 |
|---|---|---|
| KR | 10-2010-0056947 | 5/2010 |

(Continued)

OTHER PUBLICATIONS

Extended European Search Report for Application No. 12824147.8 dated Apr. 7, 2015; 6 pages.

*Primary Examiner* — Eric Keasel
*Assistant Examiner* — Danielle M Christensen
(74) *Attorney, Agent, or Firm* — Loza & Loza, LLP; Heidi L. Eisenhut

(57) ABSTRACT

Systems and method for generating reliable renewable energy using mass airflow generated from subterranean locations, such as the movement of railcars (for example, trains, both passenger and cargo) inside an underground tunnel are provided. Micro mass airflow collection equipment (MACE) units may be strategically placed in the underground tunnels and may be used to generate AC or DC power from the mass airflow created by the movement of the trains. The electricity generated from the MACE units can then be used, for example, for propulsion power to reduce the amount of electricity required to be purchased from other sources, such as the local utility company, thereby reducing costs and demand on power generation from non-renewable sources.

13 Claims, 14 Drawing Sheets

(56) References Cited

U.S. PATENT DOCUMENTS

| | | |
|---|---|---|
| 4,165,468 A | 8/1979 | Fry et al. |
| 4,207,026 A | 6/1980 | Kushto |
| 4,213,057 A | 7/1980 | Are |
| 4,522,600 A | 6/1985 | Jost |
| 4,547,124 A | 10/1985 | Kliatzkin et al. |
| 4,708,592 A | 11/1987 | Krolick et al. |
| 4,832,571 A | 5/1989 | Carrol |
| 5,222,924 A | 6/1993 | Shin et al. |
| 5,272,378 A | 12/1993 | Wither |
| 5,669,758 A | 9/1997 | Williamson |
| D395,419 S | 6/1998 | Armanno, Sr. |
| 6,616,402 B2 | 9/2003 | Selsam |
| 6,692,230 B2 | 2/2004 | Selsam |
| 7,008,172 B2 | 3/2006 | Selsam |
| 7,063,501 B2 | 6/2006 | Selsam |
| 7,427,173 B2 * | 9/2008 | Chen ............... B60L 8/00 290/44 |
| 7,902,690 B1 * | 3/2011 | Van Meveren ......... F03D 11/04 290/1 R |
| 2006/0152012 A1 * | 7/2006 | Wiegel ................... F03D 3/002 290/55 |
| 2008/0150288 A1 | 6/2008 | Fein et al. |
| 2008/0273974 A1 * | 11/2008 | Becker ..................... F03D 3/02 416/7 |
| 2009/0108586 A1 * | 4/2009 | Koury ................... F03D 3/002 290/55 |
| 2009/0315329 A1 * | 12/2009 | Duffey ................... F03D 9/002 290/44 |
| 2012/0070293 A1 * | 3/2012 | Cwiertnia .............. F03D 3/002 416/176 |

FOREIGN PATENT DOCUMENTS

| | | |
|---|---|---|
| KR | 10-1011415 | 1/2011 |
| WO | 2006/126863 A1 | 11/2006 |
| WO | 2008/086945 A2 | 7/2008 |

* cited by examiner

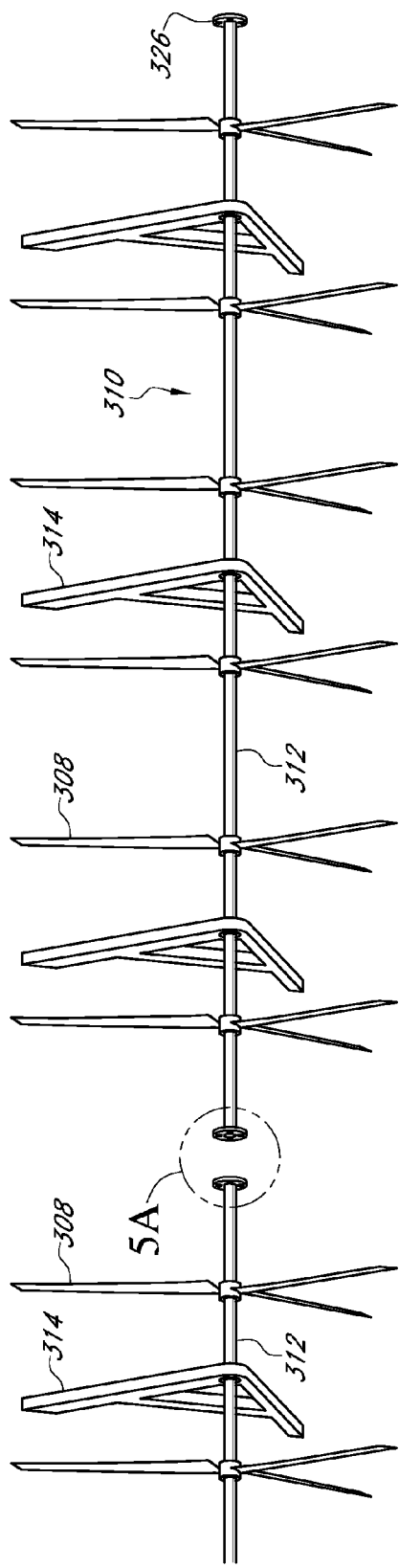
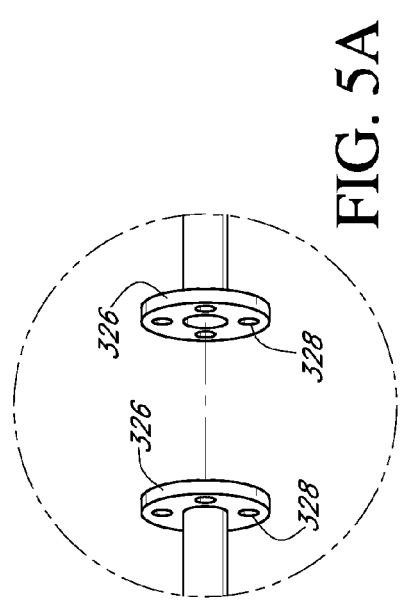
FIG. 5
FIG. 5A

US 9,541,066 B2

GENERATION OF RENEWABLE ENERGY FROM MASS AIRFLOW IN UNDERGROUND TUNNELS

CLAIM OF PRIORITY UNDER 35 U.S.C. §119

The present Application for Patent claims priority to U.S. Provisional Application No. 61/523,098 entitled "GENERATION OF RENEWABLE ENERGY FROM WIND POWER", filed Aug. 12, 2011, and is hereby expressly incorporated by reference herein.

FIELD

Various features pertain to the generation of electricity from mass airflow, and more specifically, the generation of energy, such as electricity, from the mass airflow created from the movement of railcars in a subterranean tunnel system.

BACKGROUND

Wind power is a free and inexhaustible ("renewable") source of energy. Unlike fossil fuels such as coal and oil, which exist in a finite supply and which must be extracted from the earth at great environmental cost, wind turbines harness a boundless supply of kinetic energy in the form of wind. The wind turbines are located above-ground, typically in wind farms (or wind parks) which are a group of wind turbines in the same location used to produce electric power. A large wind farm may consist of several hundred individual wind turbines, and cover an extended area of hundreds of square miles.

One area in which wind power has not been harnessed is in subterranean locations, such as underground tunnels in which railcars, such as trains, pass through. Currently, existing equipment that is used to harness above ground wind power is not capable of harnessing subterranean wind power due to many factors, such as size constraints in subterranean locations.

Consequently, what is needed is equipment that can be used in subterranean locations, like underground tunnels, that can function in enclosed spaces and be subjected to substantial impact from secondary turbulence and other site variables which are not typically encountered in existing wind parks.

SUMMARY

Various features pertain to a system for generating renewable energy from subterranean mass airflow power. The system may comprise a plurality of horizontal axis rotors attached at spaced intervals along an elongated drive shaft for harnessing the subterranean mass airflow power; one or more mounting brackets for mounting to a surface wall in an underground tunnel, the elongated drive shaft secured to the one or more mounting brackets; a generator secured to at least one end of the elongated drive shaft for converting the subterranean mass airflow power to energy. The system may also comprise one or more ball bearings mounted to the one or more mounting brackets, the elongated drive shaft extending through the one or more ball bearings.

According to one embodiment, the one or more mounting brackets may comprise a base plate having a first end and a second end; a support member, having a first side portion and a second side portion, fixedly secured to and extending upwardly from the base plate; a first side member, having a first inner surface and a first outer surface, integrally connected to and extending upwardly from the first end of the base plate to the first side portion of the support member; a second side member, having a second inner surface and a second outer surface, integrally connected to and extending upwardly from the second end of the base plate to the second side portion of the support member; and an upper plate parallel to the base plate and integrally connected to the first side portion of the support member and the second side portion of the support member. The support member may have a generally circular configuration. Additionally, the one or more mounting brackets further comprise a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket yet member, and where the second side bracket member of the second side bracket is connected to the outer surface of the second side member below the upper plate.

According to one embodiment, the system may include a first elongated member secured to the first bottom bracket member of each of the one or more mounting brackets; and a second elongated member secured to the second bottom bracket member of the each of the one or more mounting brackets; wherein the first and second elongated members are affixed to the surface wall in the underground tunnel. Additionally, the system may include a first plurality of mesh screens secured to the first side portion of the support member of each of the one more mounting brackets; and a second plurality of mesh screens secured to the second side portion of the support member of the each of the one more mounting brackets; and wherein the first side portion is a mirror image of the second side portion.

According to another embodiment, the one or more mounting brackets may comprise a base plate having a first end and a second end; an upper plate, having a first upper end and a second upper end, parallel to the base plate; a first side member, having a first inner surface and a first outer surface, integrally connected to and extending upwardly from the first end of the base plate to the first upper end of the upper plate; and a second side member, having a second inner surface and a second outer surface, integrally connected to and extending upwardly from the second end of the base plate to the second upper end of the upper plate. Additionally, the one or more mounting brackets may further comprise a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate.

According to yet another embodiment, a system for generating renewable energy from subterranean mass airflow power comprises a first plurality of mounting brackets for mounting to a surface wall in an underground tunnel; a second plurality of mounting brackets for mounting to the surface wall in the underground tunnel, the first plurality of mounting brackets different than the second plurality of mounting brackets; a plurality of horizontal axis rotors attached at spaced intervals along an elongated drive shaft for harnessing the subterranean mass airflow power, the elongated drive shaft secured to the first plurality of mounting brackets and the second plurality of mounting brackets; and a generator secured to at least one end of the elongated drive shaft for converting the subterranean mass airflow power to energy.

According to yet another embodiment, each mounting bracket in the first plurality of mounting brackets comprise a base plate having a first end and a second end; a support member, having a first side portion and a second side portion, fixedly secured to and extending upwardly from the base plate; a first side member, having a first inner surface and a first outer surface, integrally connected to and extending upwardly from the first end of the base plate to the first side portion of the support member; a second side member, having a second inner surface and a second outer surface, integrally connected to and extending upwardly from the second end of the base plate to the second side portion of the support member; and an upper plate parallel to the base plate and integrally connected to the first side portion of the support member and the second side portion of the support member. Furthermore, each mounting bracket in the first plurality of mounting brackets comprise a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate.

According to yet another embodiment, the system may comprise a first elongated member secured to the first bottom bracket member of the each of the mounting brackets in the first plurality of mounting brackets; and a second elongated member secured to the second bottom bracket member of the each of the mounting brackets in the first plurality of mounting brackets; wherein the first and second elongated members are affixed to the surface wall in the underground tunnel.

According to yet another embodiment, each mounting bracket in the second plurality of mounting brackets comprise a base plate having a first end and a second end; an upper plate, having a first upper end and a second upper end, parallel to the base plate a first side member, having a first inner surface and a first outer surface, integrally connected to and extending upwardly from the first end of the base plate to the first upper end of the upper plate; and a second side member, having a second inner surface and a second outer surface, integrally connected to and extending upwardly from the second end of the base plate to the second upper end of the upper plate. Additionally, each mounting bracket in the second plurality of mounting brackets comprise a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate.

According to yet another embodiment, a first elongated member secured to the first bottom bracket member of the each of the mounting brackets in the second plurality of mounting brackets; and a second elongated member secured to the second bottom bracket member of the each of the mounting brackets in the second plurality of mounting brackets; and wherein the first and second elongated members are affixed to the surface wall in the underground tunnel.

According to yet another embodiment, a system for generating renewable energy from subterranean mass airflow power comprises a first plurality of mounting brackets for mounting to a surface wall in an underground tunnel. Each mounting bracket in the first plurality of mounting brackets comprises a first base plate having a first end and a second end; a support member, having a first side portion and a second side portion, fixedly secured to and extending upwardly from the base plate; a first side member, having a first inner surface and a first outer surface, integrally connected to and extending upwardly from the first end of the base plate to the first side portion of the support member; a second side member, having a second inner surface and a second outer surface, integrally connected to and extending upwardly from the second end of the base plate to the second side portion of the support member; and a first upper plate parallel to the base plate and integrally connected to the first side portion of the support member and the second side portion of the support member; and a second plurality of mounting brackets for mounting to the surface wall in the underground tunnel, the first plurality of mounting brackets different than the second plurality of mounting brackets. Each mounting bracket in the second plurality of mounting brackets comprises a second base plate having a first end and a second end; a second upper plate, having a first upper end and a second upper end, parallel to the second base plate; a third side member, having a third inner surface and a third outer surface, integrally connected to and extending upwardly from the first end of the second base plate to the first upper end of the second upper plate; and a fourth side member, having a fourth inner surface and a fourth outer surface, integrally connected to and extending upwardly from the first end of the second base plate to the second upper end of the second upper plate. Furthermore, the system comprise a plurality of horizontal axis rotors attached at spaced intervals along an elongated drive shaft for harnessing the subterranean mass airflow power, the elongated drive shaft secured to the first upper plate of the first plurality of mounting brackets and the second upper plate of the second plurality of mounting brackets; and a generator secured to at least one end of the elongated drive shaft for converting the subterranean mass airflow power to energy.

According to yet another embodiment, each mounting bracket in the first plurality of mounting brackets may further comprise a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate. Additionally, each mounting bracket of the second plurality of mounting brackets may further comprise a third side bracket having a third side bracket member and a third bottom bracket member, the third bottom bracket member integrally connected to and extending outward from the third side bracket member, and where the third side bracket member of the third side bracket is connected to the outer surface of the third side member below the upper plate; and a fourth side bracket having a fourth side bracket member and a fourth bottom bracket member, the fourth bottom bracket member integrally connected to and extending outward from the fourth side bracket member, and where the fourth side bracket member of the fourth side bracket is connected to the outer surface of the fourth side member below the upper plate.

According to yet another embodiment, the system may further comprise a first elongated member secured to the first bottom bracket member of the each of the mounting brackets in the first plurality of mounting brackets and the third bottom bracket member of the each of the mounting brackets in the second plurality of mounting brackets; and a second elongated member secured to the second bottom bracket member of the each of the mounting brackets in the first plurality of mounting brackets and the fourth bottom bracket member of the each mounting bracket of the second plurality of mounting brackets; and wherein the first and second elongated members are affixed to the surface wall in the underground tunnel.

BRIEF DESCRIPTION OF THE DRAWINGS

Various features, nature, and advantages may become apparent from the detailed description set forth below when taken in conjunction with the drawings in which like reference characters identify correspondingly throughout.

FIG. 5 illustrates a fragmentary view of pair of micro mass airflow collection equipment units in an unattached position, according to one embodiment.

FIG. 5A illustrates a close up view of the unattached ends of the pair of micro mass airflow collection equipment units in FIG. 5.

DETAILED DESCRIPTION

Figure 1:
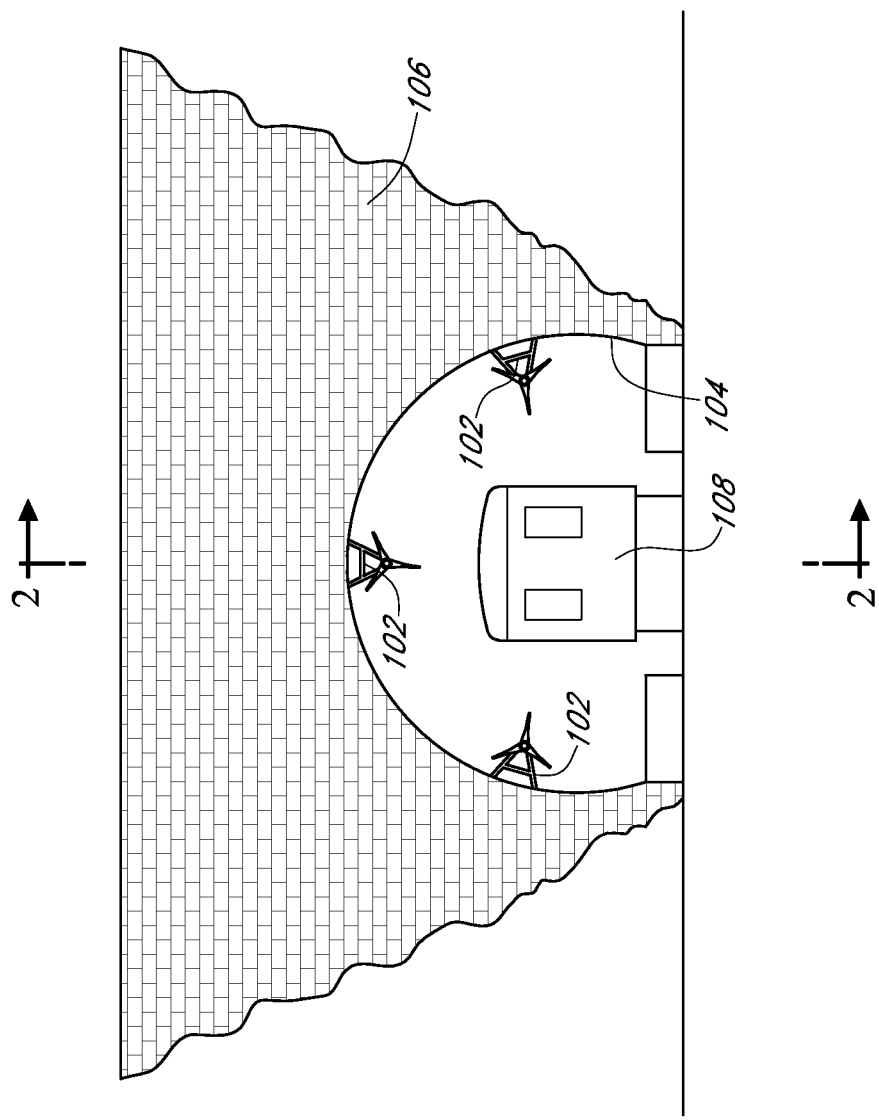
FIG. 1 illustrates a plurality of micro mass airflow collection equipment units mounted on a surface of an underground tunnel, according to one embodiment.

In the following description, specific details are given to provide a thorough understanding of the embodiments. However, it will be understood by one of ordinary skill in the art that the embodiments may be practiced without these specific details. In other instances, well known methods, procedures, and/or components have not been described in detail so as not to unnecessarily obscure the embodiments.

While the present description is described primarily with respect to a train, the present description may be applied and adapted any type of vehicle used on a rail transport system that can be used for the carrying of cargo or passengers, including but not limited to, trains, railcars, subway cars and mining cars.

Overview

According to one aspect, the mass airflow generated from the movement of trains (both passenger and cargo) inside an underground tunnel may be used to generate reliable renewable energy. Micro mass airflow collection equipment (MACE) units strategically placed in the underground tunnels may be used to generate AC or DC power from the mass airflow created by the movement of the trains. The electricity generated from the MACE units can then be used, for example, for propulsion power to reduce the amount of electricity required to be purchased from other sources, such as the local utility company, thereby reducing costs and demand on power generation from non-renewable sources.

As a train moves through the confined space of the tunnel it creates a massive displacement of the air in the tunnel. For example the train can create an extremely powerful blast of wind (up to 70 mph, for example) lasting for up to 120 seconds, for example. The strength and time frame of the wind depend on the length and speed of train and the 70 mph and 120 second are provided as one example only. The mass air movement created by this "Train Initiated Event" (or "TIE") is in direct proportion to the speed and length of the train.

The TIE creates both a compression of the air in front of the train and a following replacement suction of equivalent volume behind the train. Both of these elements create mass air flow which can be captured and used to generate energy to be used for electricity or other mechanical operations. Measurement of the air flow may be achieved by modification of above-ground wind energy measuring equipment. The mass airflow energy generated by the TIE can be captured by means of modified mini-turbines (the "MACE units") which can be set in a linear configuration along the walls of the subterranean or underground tunnel at a safe distance from the trains.

The speed of the moving air mass generated by the train passing through the tunnel may go up arithmetically while the energy created by that moving air mass goes up geometrically. This means that the high speed mass airflow created by the train may be extremely productive during its brief existence. That high energy event may be extremely predictable and can be made usable to create energy, such as electricity, if and when it can be captured and used in a measured manner.

Unlike an above-ground wind farm, the equipment to be used in the tunnels, described in further detail below, can function in an enclosed space and thus will be subject to substantial impact from secondary turbulence and other site variables which are not typically encountered in existing wind parks. These variables include, but are not limited to: (a) numerous tunnel and equipment location variables including length of straightaway and proximity of MACE units to curves, stations, interior rooms, etc.; (b) location of pipes and other equipment in the tunnels, and the turbulence created by such items; (c) "train effects" including train length and the siphoning effect created by a train after passing generating equipment; and (d) safety and environmental considerations.

Measurement of the air flow may be achieved by modification of above-ground wind energy measuring equipment. The mass airflow energy generated by the TIE can be captured by means of modified mini-turbines (the "MACE units") which can be set in a linear configuration along the walls of the tunnel at a safe distance from the trains.

Micro Mass Airflow Collection Equipment (MACE) Units

As shown in FIG. 1, one or more MACE units 102 may be mounted on a surface 104 (walls and/or ceiling) of a tunnel 106. Standard or specialized mounting hardware 103 can be used to securely mount the MACE units 102 to the tunnel surface 104. According to one example, the one or more MACE units 102 may be mounted in approximately the top half of the tunnel 106. Alternatively, the MACE units 102 may be mounted in approximately the top third of the tunnel 106.

As described above, the plurality of MACE units 102 can generate either AC or DC power from the mass airflow created by the movement of trains 108 in the tunnel system. The plurality of MACE units 102 can be deployed/installed in varying configurations in any tunnel; and can be modified in rotor size to provide for sufficient clearance between the trains and the tunnel walls. The electrical power generated by the conversion of the mass airflow energy can be used for purposes including, but not limited to, train propulsion, station power (including lights, escalators, air conditioning, etc), tunnel lighting, and other rail related and non-related uses.

Figure 2:
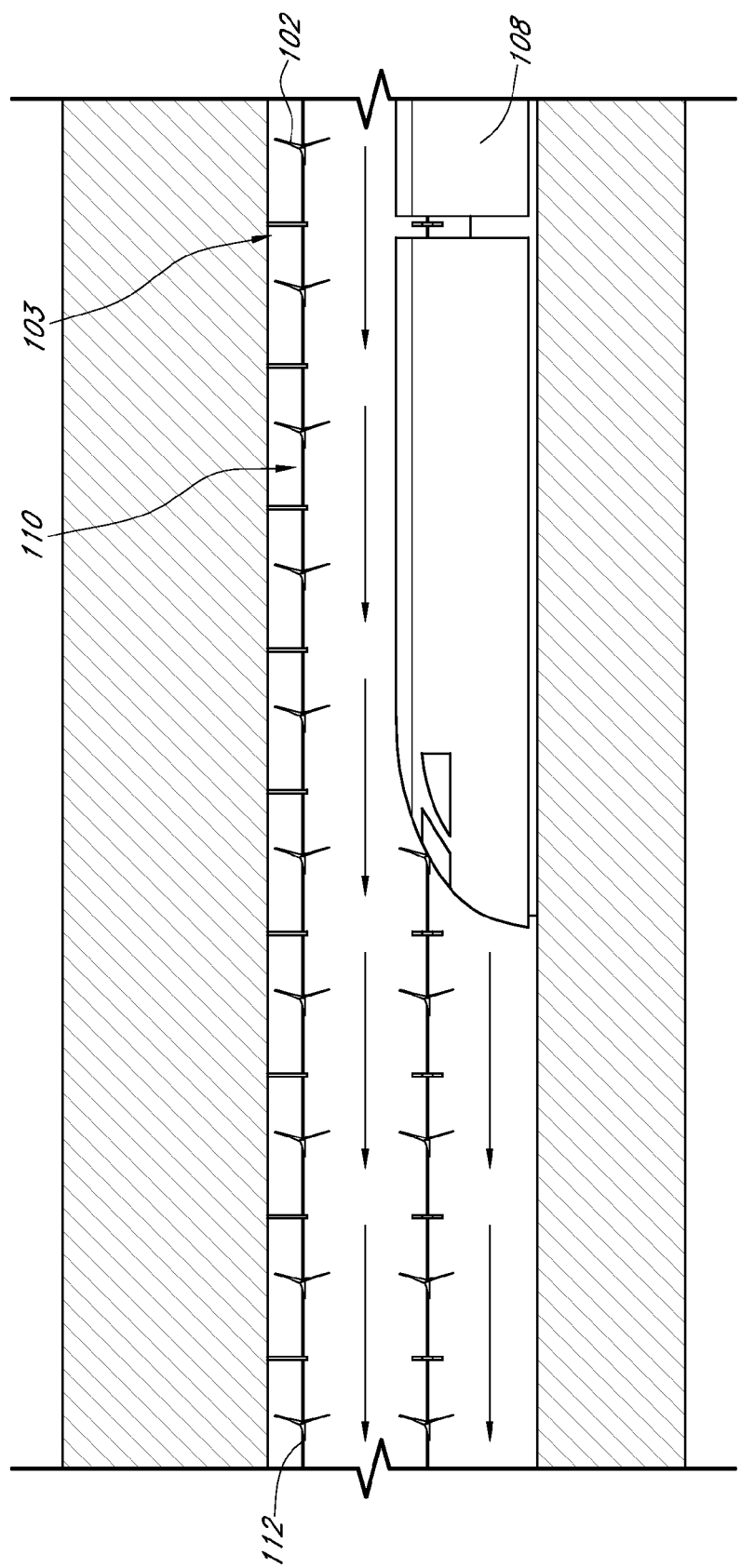
FIG. 2 illustrates a cross-sectional view taken along lines 2-2 of FIG. 1.

Turning to FIG. 2, a cross-sectional view taken along lines 2-2 of FIG. 1 is shown. The MACE units may be comprised of multiple horizontal axis rotors which are coaxially attached at spaced intervals 110 to an elongated drive shaft 112. The MACE units may be installed within the tunnel 106 and are able to capture the mass airflow energy generated by movement of the trains in either direction 108. The shaft 112 of the MACE units can be supported by brackets and attached to the tunnel walls and/or ceiling, so as to actively respond to mass airflow in either direction as it is created by the movement of trains in the tunnel system. The MACE units 102 may have multiple small rotors, which weigh less than an equivalent large rotor and can rotate faster and transmit the same power at less torque. This more closely matches the required rpms for a generator, which reduces or eliminates the need for ratio gearing. As described above, the captured mass airflow energy can be converted into usable energy, such as useable AC or DC current, which can be used (in the appropriate form) for propulsion power for trains using the tunnel system, for power to the subway stations, and for other related or non-related purposes.

Figure 3:
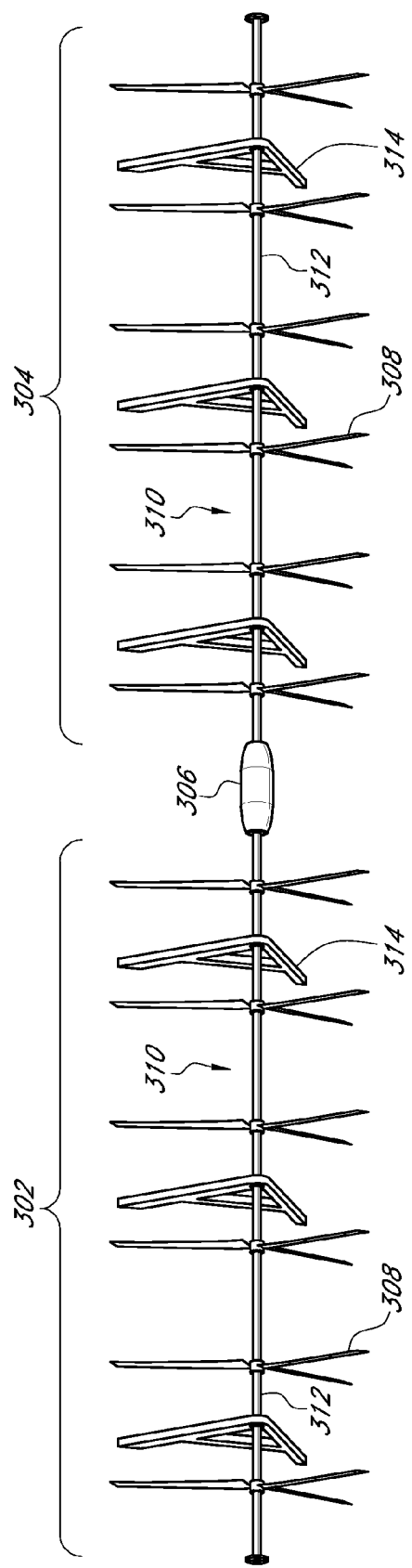
FIG. 3 illustrates a pair of micro mass airflow collection equipment units attached together, according to one embodiment.

FIG. 3 illustrates a pair of MACE units attached together by any suitable attachment means, according to one embodiment. The MACE units may be fixedly or releasably secured together. As shown, a first MACE unit 302 may be attached to a second MACE unit 304 by a nacelle 306. Each of the MACE units 302, 304 may be comprised of multiple horizontal axis rotors 308 coaxially attached at spaced intervals 310 to an elongated drive shaft 312. Furthermore, each MACE unit 302, 304 may include one or more attachment means 314 attached at spaced intervals to the elongated drive shaft 312 for securely mounting the MACE units 302, 304 to a tunnel surface. According to one embodiment, the attachment means 314 may be in the form of an "A" frame.

Figure 4:
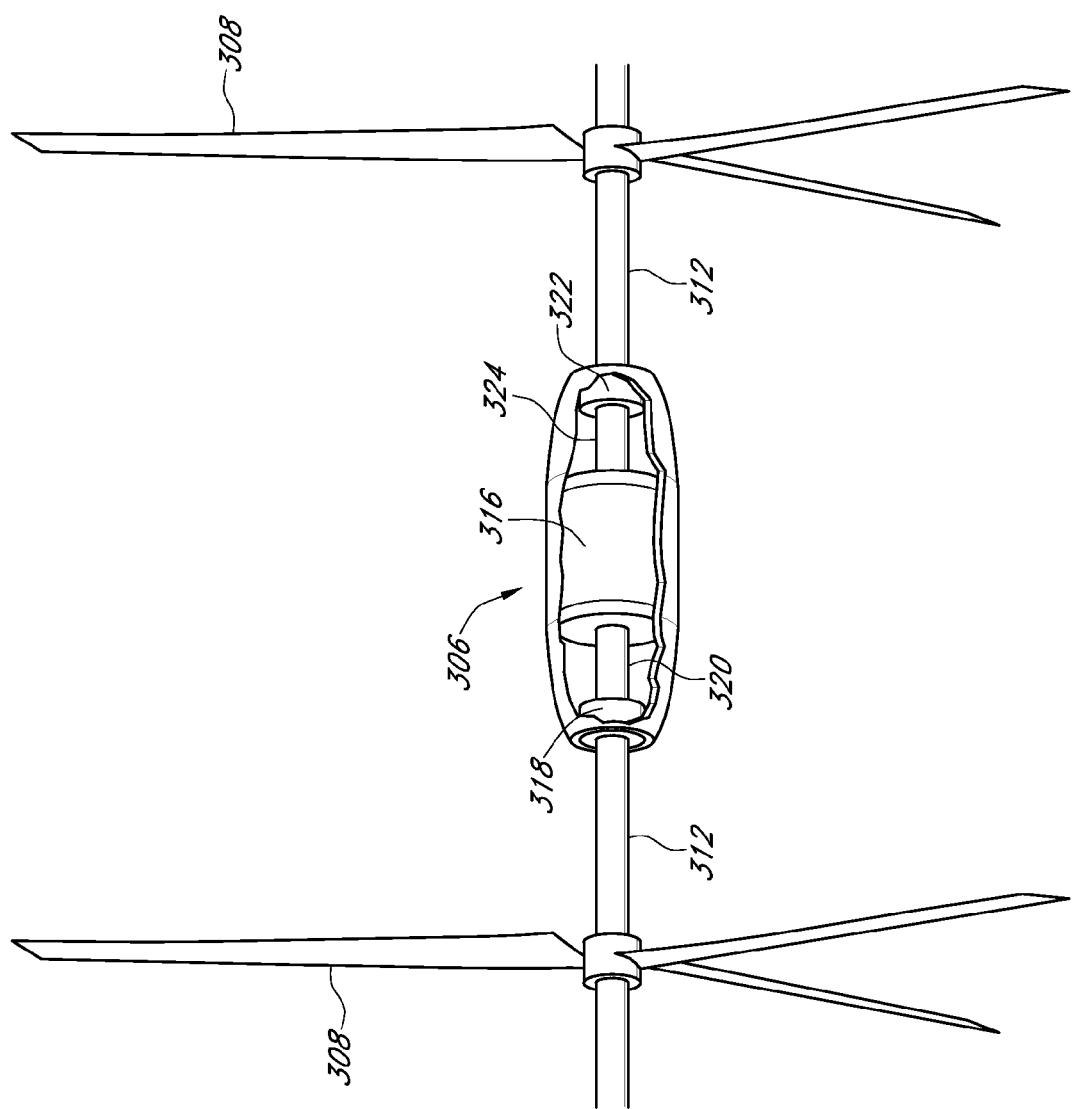
FIG. 4 illustrates a close-up partially cut-away view of a nacelle and components for attaching a pair of micro mass airflow collection equipment units together, according to one embodiment.

FIG. 4 illustrates a close-up partially cut-away view of the nacelle of FIG. 3 for attaching the pair of micro mass airflow collection equipment units together. The nacelle 306 may comprise a generator 316 connected to a first thrust bearing 318 by a first shaft 320 and a second thrust bearing 322 by a second shaft 324 for converting the subterranean mass airflow power to energy to be used for electricity or other mechanical operations. The energy may be supplied to a battery bank, power distribution center or capacitor panel, for example.

FIG. 5 illustrates a fragmentary view of pair of MACE units in an unattached position, according to one embodiment. As shown, each end the elongated drive shafts 312 may include an attachment member 326. The attachment member may be comprised of a plate having a plurality of holes 328. To attach a first MACE unit to a second MACE unit, a first attachment member at a first end of the first MACE unit may be mated with a second attachment member at a second end of the second MACE unit such that the plurality of holes 328 of the first attachment member are aligned with the plurality of holes 328 of the second attachment member. The plurality of holes 328 may be threaded such that an equal number of screws may inserted into the plurality of holes 328 matingly engaging the first attachment member to the second attachment member.

Figure 6:
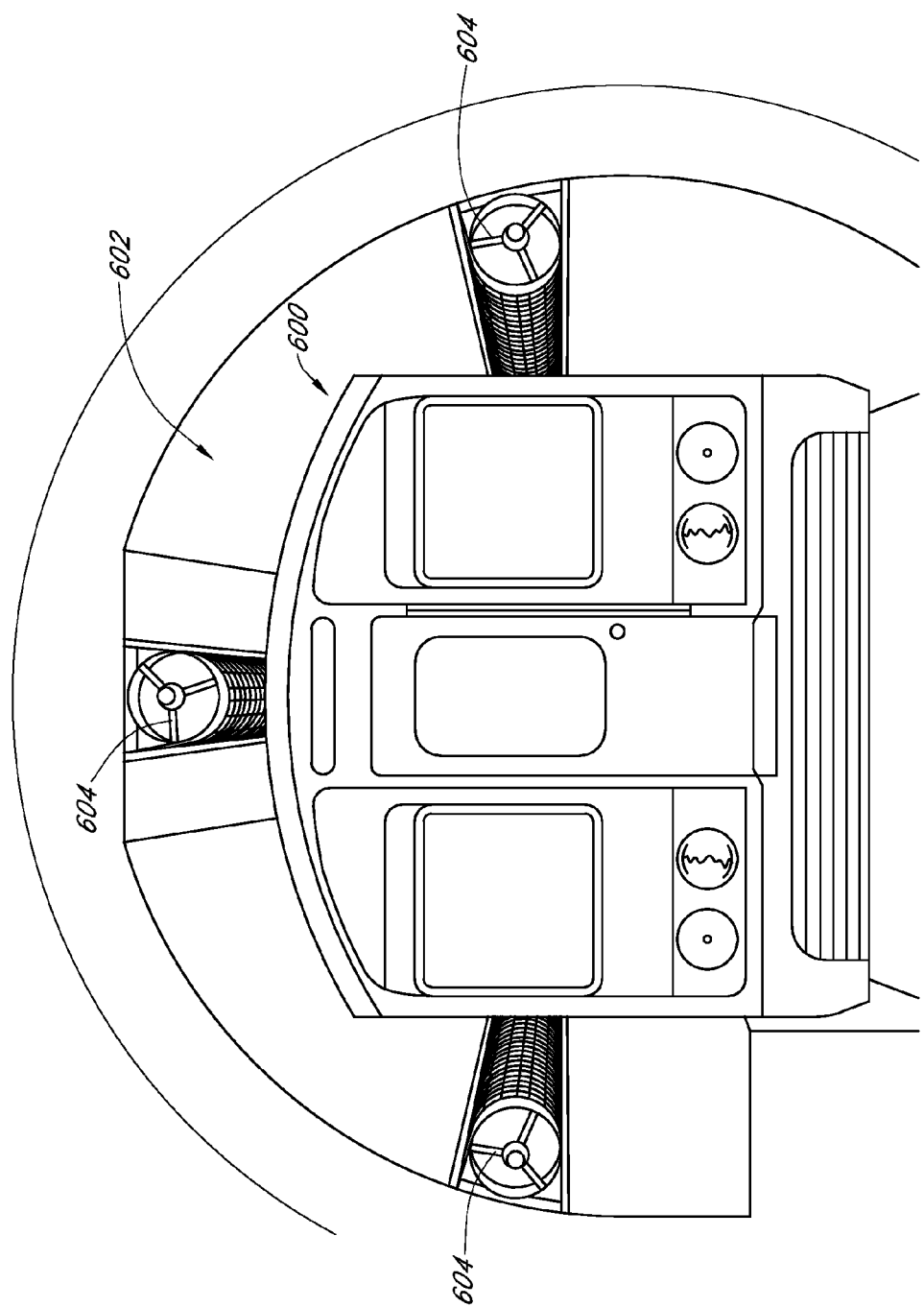
FIG. 6 illustrates a train in an underground tunnel having a plurality of micro mass airflow collection equipment units mounted on a surface the tunnel, according to one embodiment.

FIG. 6 illustrates a train in a tunnel having a plurality of micro mass airflow collection equipment units mounted on a surface the tunnel, according to one embodiment. As shown, a train 600 can pass through the confined space of the tunnel 602 to create a massive displacement of the air in the tunnel 602. One or more MACE units 604 may be mounted on a surface of the tunnel 602. Although three (3) MACE units 604 are shown mounted to the surface of the tunnel 602, this is by way of example only.

Figure 7:
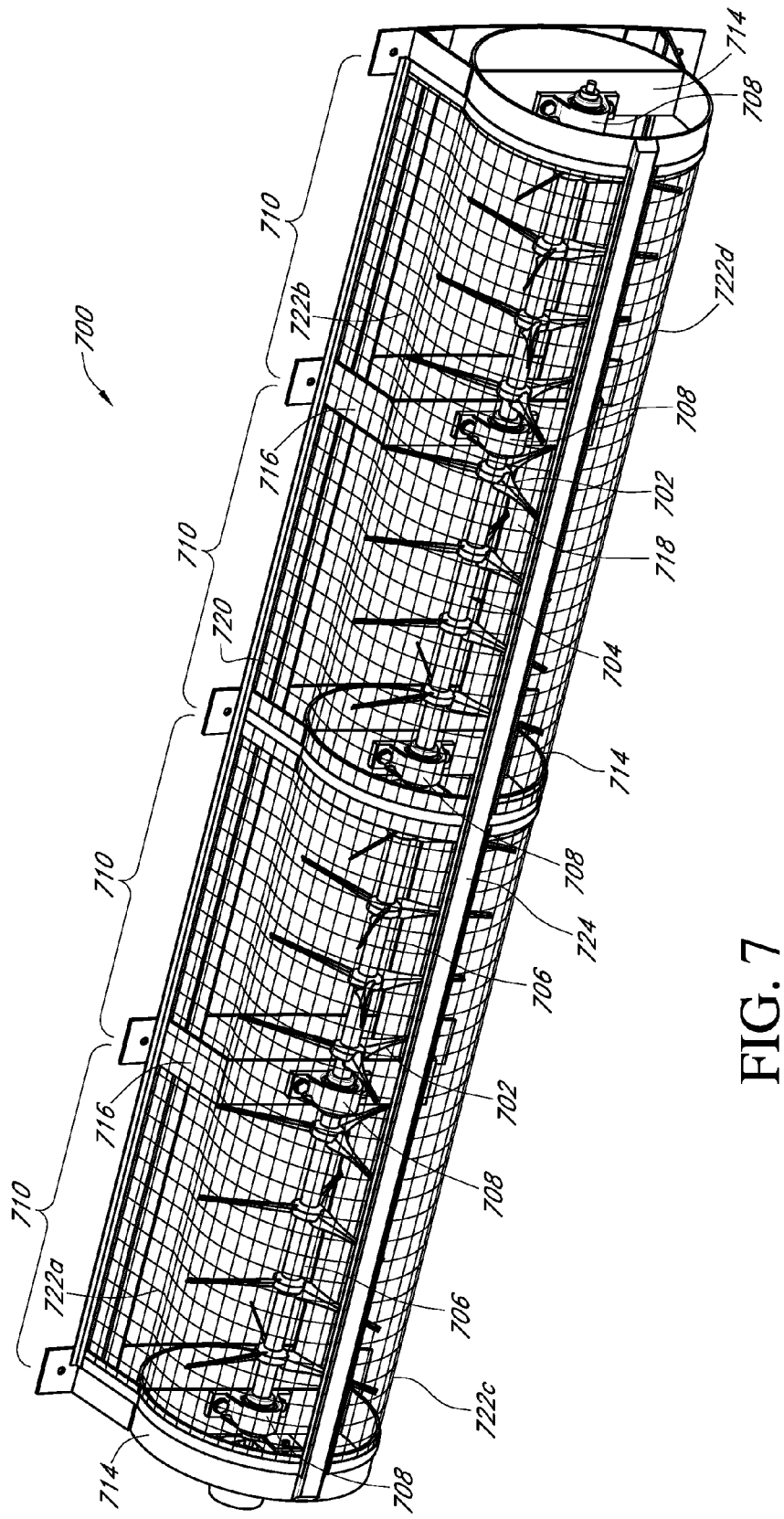
FIG. 7 illustrates a micro mass airflow collection equipment unit, according to one embodiment.

FIG. 7 illustrates a micro mass airflow collection equipment (MACE) unit 700, according to one embodiment. The MACE unit 700 may comprise multiple horizontal axis rotors 702 which are coaxially attached at spaced intervals 704 to an elongated drive shaft 706. The elongated drive shaft 706 may extend through ball bearings 708 mounted, at spaced intervals 710, to one or more first mounting brackets 714 and/or one or more second mounting brackets 716. According to one embodiment, the first mounting brackets 714 may be different than the second mounting brackets.

As shown, the MACE unit 700 may include a first plurality of mounting brackets, such as three (3) first mounting brackets 714 located at the ends and middle of the MACE unit 700, and a second plurality of mounting brackets, such as two (2) second mounting brackets 716, one (1) located between each end and middle first mounting bracket 714. A first angle brace 718 and a second angle brace 720 may be secured to upper surfaces of base plates of the one or more first mounting brackets 714 and the one or more second mounting brackets 716, described in further detail below. The first angle brace 718 and the second angle brace 720 may extend parallel to each other in the same horizontal plane and may be located equidistance from the elongated drive shaft 706 located parallel to but in a different horizontal plane than the first and second angle braces 718, 720. A plurality of mesh screens 722a-722d may be used to cover the multiple horizontal axis rotors 702 to prevent trash and debris, as well as humans, from coming into contact with the multiple horizontal axis rotors 702. A rail member 724 may be secured to and extend the length of the top portions of plurality of mesh screens 722a-722d preventing the mesh screens 722a-722d from being removed or falling off. The bottom of the mesh screens may be secured by first and second side brackets (See FIG. 10 and FIG. 12) of the first and second mounting brackets 714, 716.

According to one embodiment, when the MACE unit comprises first and second mounting brackets that are different, the second mounting brackets may be defined as having a third side member, having a third inner surface and a third outer surface, integrally connected to and extending upwardly from the first end of the second base plate to the first upper end of the second upper plate; and a fourth side member, having a fourth inner surface and a fourth outer surface, integrally connected to and extending upwardly from the first end of the second base plate to the second upper end of the second upper plate. Additionally, the second mounting brackets may be defined as having a third side bracket having a third side bracket member and a third bottom bracket member, the third bottom bracket member integrally connected to and extending outward from the third side bracket member, and where the third side bracket member of the third side bracket is connected to the outer surface of the third side member below the upper plate; and a fourth side bracket having a fourth side bracket member and a fourth bottom bracket member, the fourth bottom bracket member integrally connected to and extending outward from the fourth side bracket member, and where the fourth side bracket member of the fourth side bracket is connected to the outer surface of the fourth side member below the upper plate.

Figure 8:
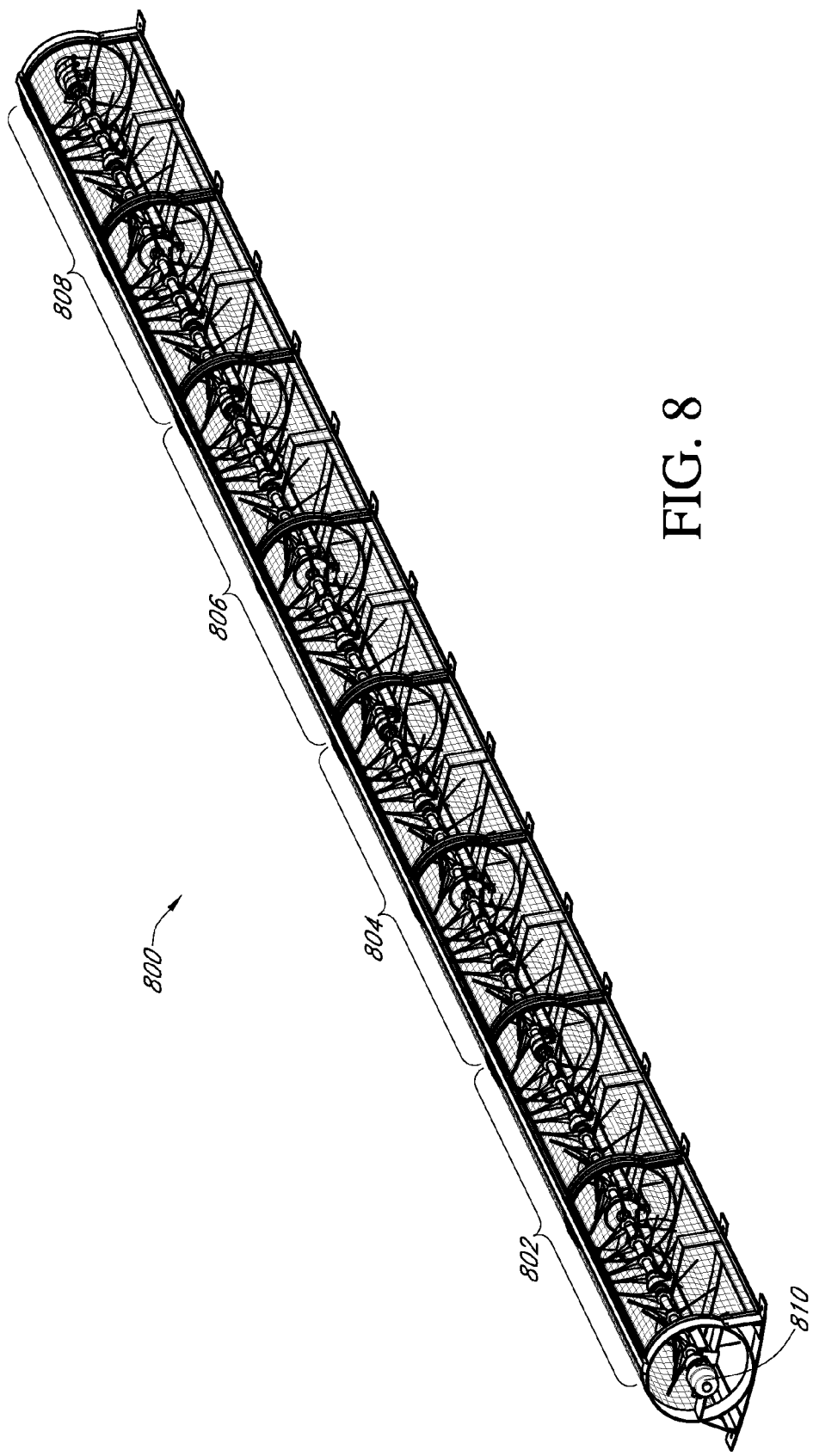
FIG. 8 illustrates a plurality of micro mass airflow collection equipment units attached together, according to one embodiment.

FIG. 8 illustrates a plurality of micro mass airflow collection equipment (MACE) units attached together, according to one embodiment. As subterranean tunnel systems vary in size, multiple MACE units may be secured together to accommodate the size of the subterranean tunnel and the trains that pass through the subterranean tunnel. In order to capture or harness all available subterranean mass airflow power generated by the trains passing through the subterranean tunnel, the MACE units may extend the entire length of the available surface of one or more walls or surfaces (including the ceiling) in the tunnel. As shown in FIG. 8, multiple MACE units 802-808 may be connected end to end to obtain a MACE unit 800 that is the appropriate length for the available surface on the wall of the tunnel. According to one embodiment, each of the MACE units 802-808 may be 10 feet in length so connecting the four (4) MACE units 802-808 end to end can create a MACE unit of 40 feet. Although each of the MACE units 802-808 is described as being 10 feet in length, this is by way of example only and each of the MACE units 802-808 may be longer than 10 feet or shorter than 10 feet. Additionally, each of the MACE units 802-808 can vary in length, i.e. MACE unit 802 may have a length different than the length of MACE unit 804, MACE unit 804 may have a length different than the length of MACE unit 806, etc.

A generator 810 may be secured to the elongated drive shaft (See FIG. 7) for converting the subterranean mass airflow power to energy to be used for electricity or other mechanical operations. The energy may be supplied to a battery bank, power distribution center or capacitor panel, for example.

Figure 9:
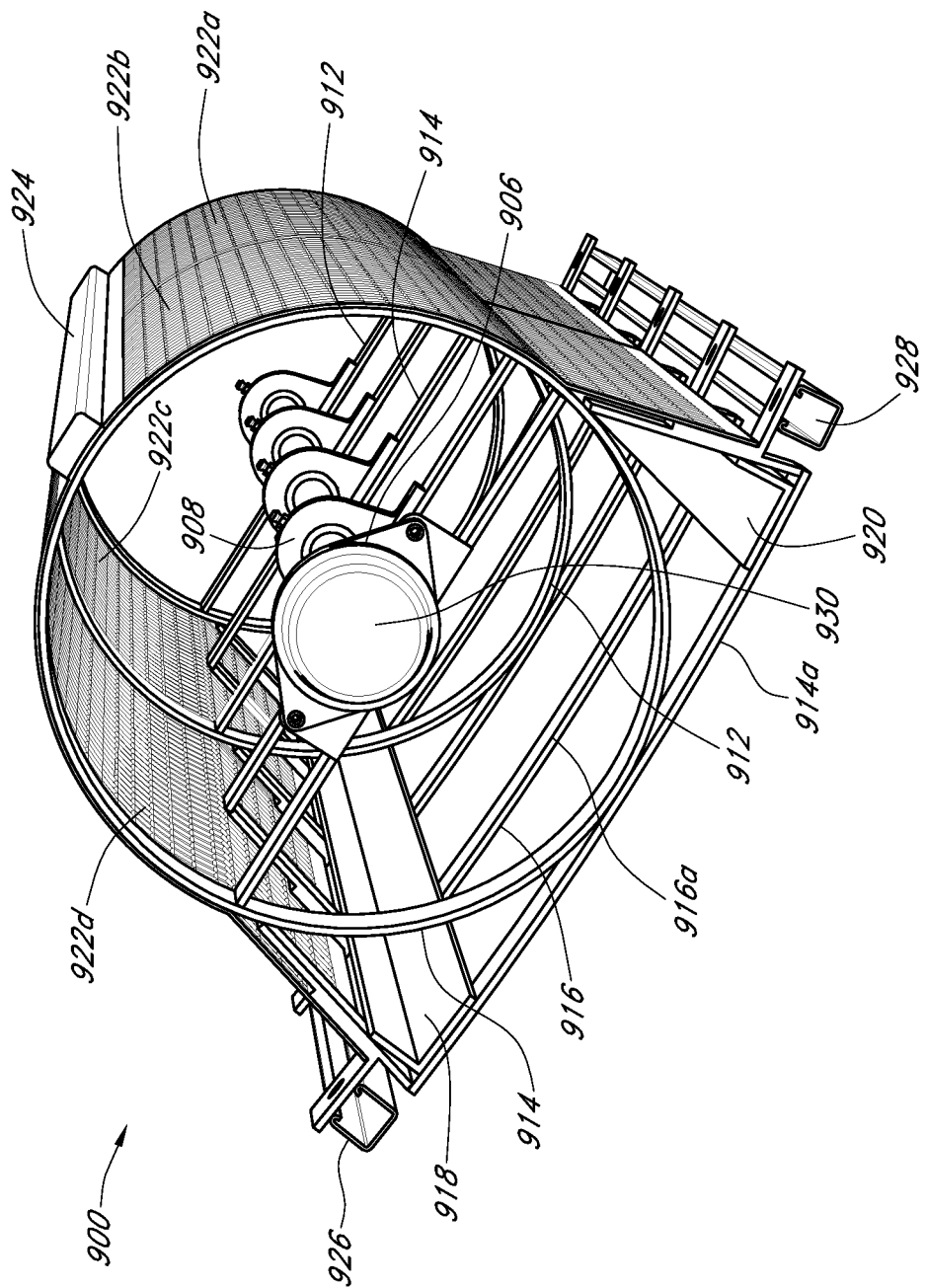
FIG. 9 illustrates an internal perspective view of a micro mass airflow collection equipment unit without horizontal axis rotors, according to one embodiment.

FIG. 9 illustrates an internal perspective view of a micro mass airflow collection equipment (MACE) unit 900 without horizontal axis rotors, according to one embodiment. The MACE unit 900 may comprise multiple horizontal axis rotors (not shown) which are coaxially attached at spaced intervals to an elongated drive shaft 906. The elongated drive shaft 906 may extend through ball bearings 908 mounted, at spaced intervals, to one or more first mounting brackets 912 and/or one or more second mounting brackets 916. As shown, the MACE unit 900 may include three (3) first mounting brackets 914 located at the ends and middle of the MACE unit 900 and two (2) second mounting brackets 916, one (1) located between each end and middle second mounting brackets 914. This is by way of example only and there may be more than or less than three (3) first mounting brackets and more than or less than two (2) second mounting brackets. Although the first and second mounting bracket are shown as different, this is by way of example only the mounting brackets in the MACE unit may be the same.

A first angle brace 918 and a second angle brace 920 may be secured to upper surfaces of base plates 914a, 916a, respectively, of the one or more first mounting brackets 914 and the one or more second mounting brackets 916, described in further detail below. The first angle brace 918 and the second angle brace 920 may extend the entire length of the MACE unit 900 and be secured to each of the upper surfaces of base plates 914a, 916a, respectively, of the one or more first mounting brackets 914 and the one or more second mounting brackets 916, respectively. The first angle brace 918 and the second angle brace 920 may be "L" shaped brackets. According to one embodiment, the first angle brace 918 may be parallel to the second angle brace 920 and the elongated drive shaft 906 may be located above and equidistant from the first angle brace 918 and the second angle brace 920.

A plurality of mesh screens 922a-922d may be used to cover the multiple horizontal axis rotors (not shown) to prevent trash and debris, as well as humans, from coming into contact with the horizontal axis rotors (not shown). A rail member 924 may be secured to and extend the length of the top portions of plurality of mesh screens 922a-922d preventing the mesh screens 922a-922d from being removed or falling off. The bottom of the mesh screens may be secured to first and second bottom walls of first and second side brackets (See FIG. 10 and FIG. 12) of the first and second mounting brackets 914, 916. A pair of elongated members 926, 928 may be secured to first and second bottom walls of the first and second side brackets (See FIG. 10 and FIG. 12). According to one embodiment, each of the elongated members 926, 928 may be a uni-strut.

As described in further detail below, according to one embodiment, a first plurality of mesh screens may be secured to a first side portion of a support member of each of the first mounting brackets and a second plurality of mesh screens may be secured to a second side portion of the support member of the first mounting brackets, the first side portion may be a mirror image of the second side portion.

According to one embodiment, a generator 930 may be secured to the elongated drive shaft 906 for converting the subterranean mass airflow power to energy to be used for electricity or other mechanical operations. (not shown, See FIG. 7) The energy may be supplied to a battery bank, power distribution center or capacitor panel, for example.

Figure 10:
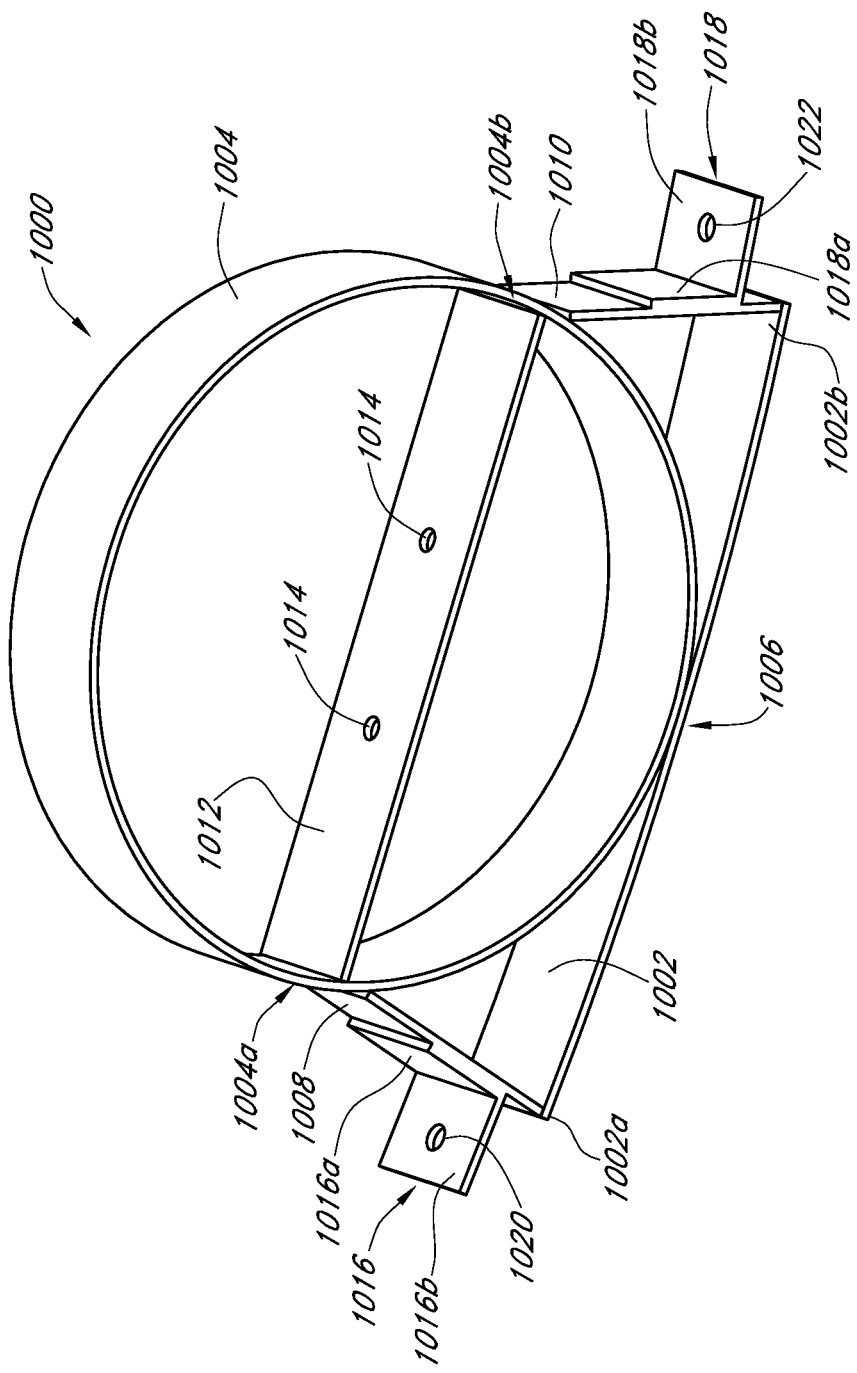
FIG. 10 illustrates a mounting bracket, according to one embodiment.

FIG. 10 illustrates a mounting bracket, according to one embodiment. The mounting bracket 1000 may comprise a base plate 1002 having a first end 1002*a* and a second end 1002*b* and a generally rectangular configuration for securing to a surface of an underground tunnel. A support member 1004 may be fixedly secured to the base plate 1002 at approximately the mid-point 1006 of the base plate 1002. According to one embodiment, the support member 1004 may have a generally circular configuration and the width of the circular member may be approximately the same width as the base plate 1002. According to one embodiment, the support member may have a first side portion and a second side portion where the first side portion may be a mirror image of the second side portion creating the circular configuration.

A first side member 1008 and a second side member 1010 may be integrally connected to and extend vertically upward and inward at a slight angle from the first end 1002*a* and the second end 1002*b* of the base plate 1002, respectively, to a first side portion 1004*a* of the support member 1004 and a second side portion 1004*b* of the support member 1004, respectively.

An upper plate 1012 may be located approximately parallel to the base plate 1002 and within the support member 1004 secured to the first side portion 1004*a* of the support member 1004 and a second side portion 1004*b* of the support member 1004. According to one embodiment, the upper plate 1012 may include one or more holes 1014 for securing the upper plate 1012 to a ball bearing, as described above.

A first side bracket 1016 and a second side bracket 1018 may be secured to outer surfaces of the first side member 1008 and second side member 1010. According to one embodiment, the first and second side brackets 1016, 1018 may be "L" shaped brackets having first and second side walls (or first side bracket members) 1016*a*, 1018*a*, respectively, integrally connected to first and second bottom walls (or bottom bracket members) 1016*b*, 1018*b*, respectively. The first and second side brackets 1016, 1018 may have approximately the same width of the first and second side members 1008, 1010. The first and second side walls (or first side bracket members) 1016*a*, 1018*a* may be integrally connected to the first side member 1008 and the second side member 1010, respectively, such that the first and second bottom walls (or bottom bracket members) 1016*b*, 1018*b* extend outwardly from the first and second side members 1008, 1010. The first and second bottom walls (or bottom bracket members) 1016*b*, 1018*b* may include one or more holes 1020, 1022 for attaching angle braces, as described above. In some embodiments the length of the first and second side walls (or first side bracket members) 1016*a*, 1018*a* may have the same length as the first and second bottom walls (or bottom bracket members) 1016*b*, 1018*b* while in other embodiments, the first and second side walls (or first side bracket members) 1016*a*, 1018*a* may have a different length than the first and second bottom walls (or bottom bracket members) 1016*b*, 1018*b*.

In some embodiments, first and second side brackets 1016, 1018 may be removably secured to the first and second side members 1008, 1010 while in other embodiments, the first and second side brackets 1016, 1018 may be fixedly secured to the first and second side members 1008, 1010.

Figure 11:
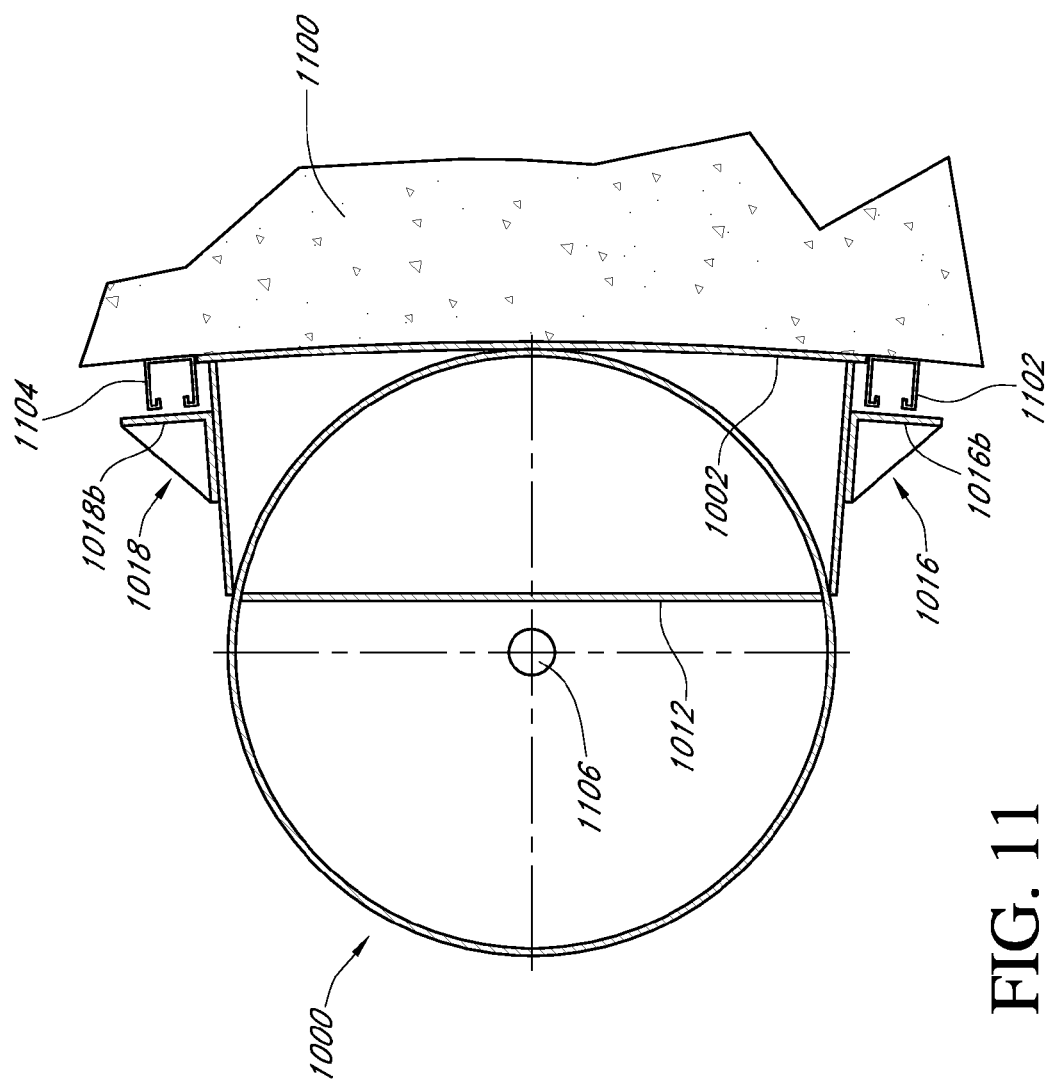
FIG. 11 illustrates the mounting bracket of FIG. 10 mounted to a surface wall of a tunnel.

FIG. 11 illustrates the mounting bracket of FIG. 10 mounted to a surface wall 1100 of a tunnel. In some embodiments, the base plate 1002 of the first mounting bracket 1000 may be flexible for conforming to the surface of the wall while in other embodiments, the base plate 1002 of the first mounting bracket 1000 may rigid.

A pair of elongated members 1102, 1104 may be secured to first and second bottom walls 1016*b*, 1018*b* of the first and second side brackets 1016, 1018 and the wall 1100 of the tunnel. According to one embodiment, each of the elongated members 1102, 1104 may be a uni-strut. As shown, when part of a MACE unit, an elongated shaft 1106 may be located above the upper plate 1012 of the mounting bracket 1000.

Figure 12:
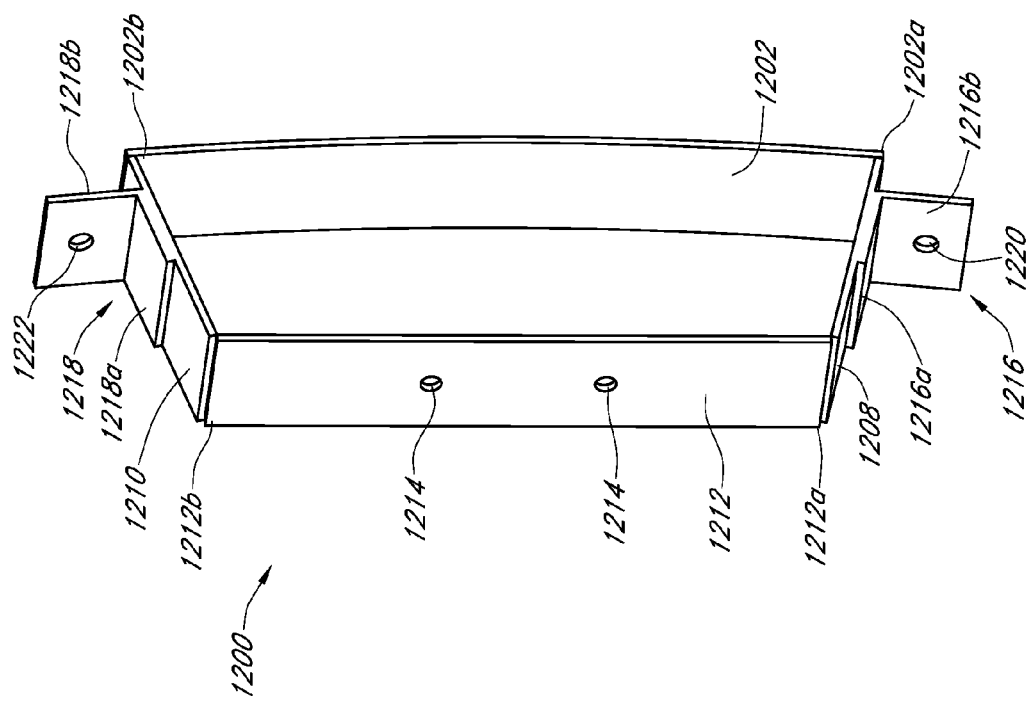
FIG. 12 illustrates a mounting bracket, according to one embodiment.

FIG. 12 illustrates a mounting bracket, according to one embodiment. The mounting bracket 1200 may comprise a base plate 1202 having a first end 1202*a* and a second end 1202*b* and a generally rectangular configuration for securing to a surface or wall of an underground tunnel. In some embodiments, the base plate 1202 of the mounting bracket 1200 may be flexible for conforming to the surface of the wall of a tunnel while in other embodiments, the base plate 1202 of the first mounting bracket 1200 may rigid.

A first side member 1208 and a second side member 1210 may be integrally connected to and extend vertically upward and inward at a slight angle from the first end 1202*a* and the second end 1202*b* of the base plate 1202, respectively, to a first end 1212*a* and a second end 1212*b* of an upper plate 1212, respectively. The upper plate 1212 may be located approximately parallel to the base plate 1202 and may have approximately the same width. According to one embodiment, the upper plate 1212 may include one or more holes 1214 for securing the upper plate 1212 to a ball bearing, as described above.

A first side bracket 1216 and a second side bracket 1218 may be secured to outer surfaces of the first side member 1208 and second side member 1210, respectively. According to one embodiment, the first and second side brackets 1216, 1218 may be "L" shaped brackets having first and second side walls 1216*a*, 1218*a* integrally connected to first and second bottom walls 1216*b*, 1218*b* integrally connected to and extending outwardly from the first and second side members 1208, 1210. The first and second side brackets 1216, 1218 may have approximately the same width of the first and second side members 1208, 1210. The first and second side walls 1216*a*, 1218*a* may be integrally connected to the first side member 1208 and the second side member 1210, respectively, such that the first and second bottom walls 1216*b*, 1218*b* extend outwardly from the first and second side members 1208, 1210. The first and second bottom walls 1216*b*, 1218*b* may include one or more holes 1220, 1222 for attachment to elongated members, such as angle braces, as described above. In some embodiments the length of the first and second side walls 1016*a*, 1018*a* may have the same length as the first and second bottom walls 1216*b*, 1218*b* while in other embodiments, the first and second side walls 1216*a*, 1218*a* may have a different length than the first and second bottom walls 1216*b*, 1218*b*.

In some embodiments, first and second side brackets 1216, 1218 may be removably secured to the first and second side members 1208, 1210 while in other embodiments, the first and second side brackets 1216, 1218 may be fixedly secured to the first and second side members 1208, 1210.

Figure 13:
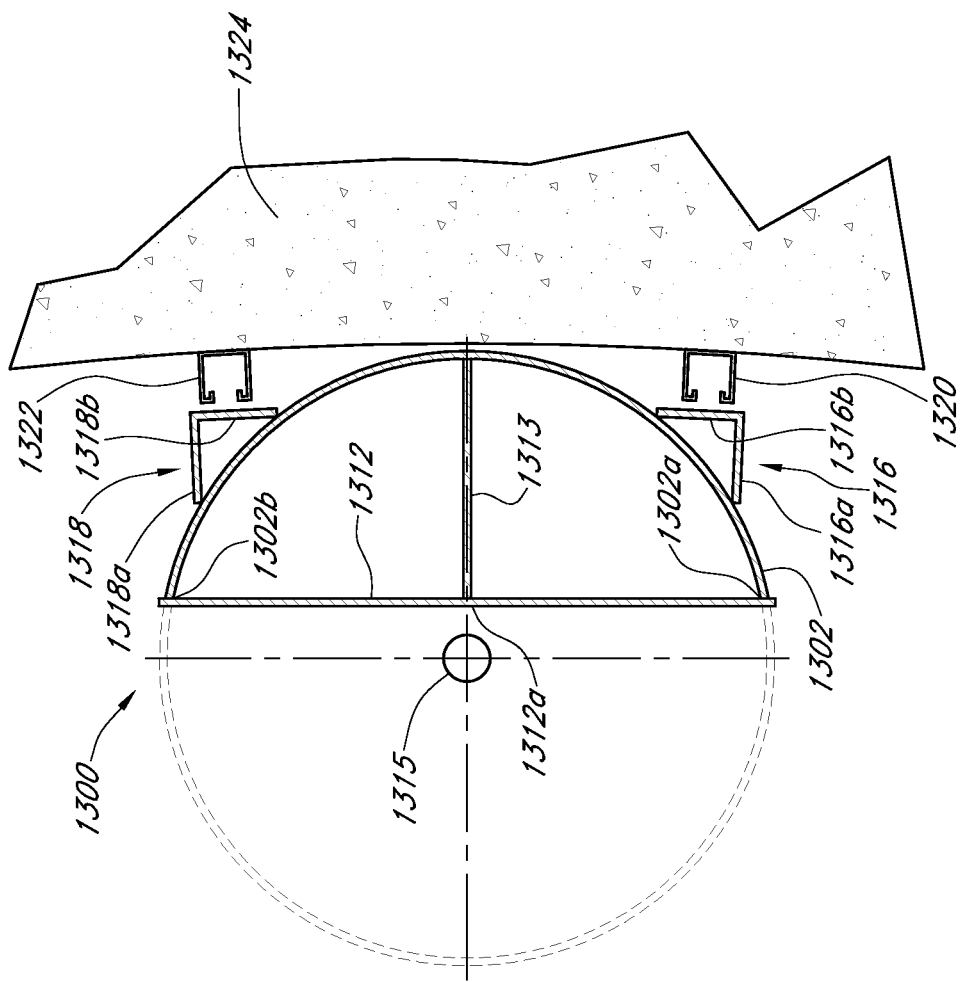
FIG. 13 illustrates a mounting bracket mounted to a surface wall of a tunnel, according to one embodiment.

FIG. 13 illustrates a mounting bracket mounted to a surface wall of a tunnel, according to one embodiment. The mounting bracket 1300 may comprise a curved base plate 1302 having a first end 1302a and a second end 1302b. An upper plate 1312 may be fixedly secured to the first and second ends 1302a, 1302b of the upper plate 1302. Optionally, a support member 1313 may fixedly or releasbly secured between a center portion 1312a of the upper plate 1312 and a center portion 1302a of the curved base plate 1302.

The upper plate 1312 may have approximately the same width of the curved based plate 1302. According to one embodiment, the upper plate 1312 may include one or more holes (not shown) for securing the upper plate 1312 to a ball bearing for supporting an elongated shaft 1315, as described above. The dashed lines represent the movement of rotors that are attached to the elongated shaft 1315.

A first side bracket 1316 and a second side bracket 1318 may be secured to the outer surface of the curved base member 1302. According to one embodiment, the first and second side brackets 1016, 1018 may be "L" shaped brackets having first and second side walls 1316a, 1318a, integrally connected to first and second bottom walls 1316b, 1318b. The first and second bottom walls 1316b, 1318b may be integrally connected to and extend outwardly at a slightly upward angle from the curved base plate 1302. The first and second side walls 1316a, 1318a may be integrally connected to the curved base plate 1302 and extend outwardly and downwardly and be integrally connected to the first and second bottom walls 1316b, 1318b.

According to one embodiment, the first and second bottom walls 1316b, 1318b may include one or more holes (not shown) for attachment to a pair of elongated members 1320, 1322. The pair of elongated members 1320, 1322 may be secured to the wall 1324 of the tunnel. According to one embodiment, each of the elongated members 1320, 1322 may be a uni-strut.

Figure 14:
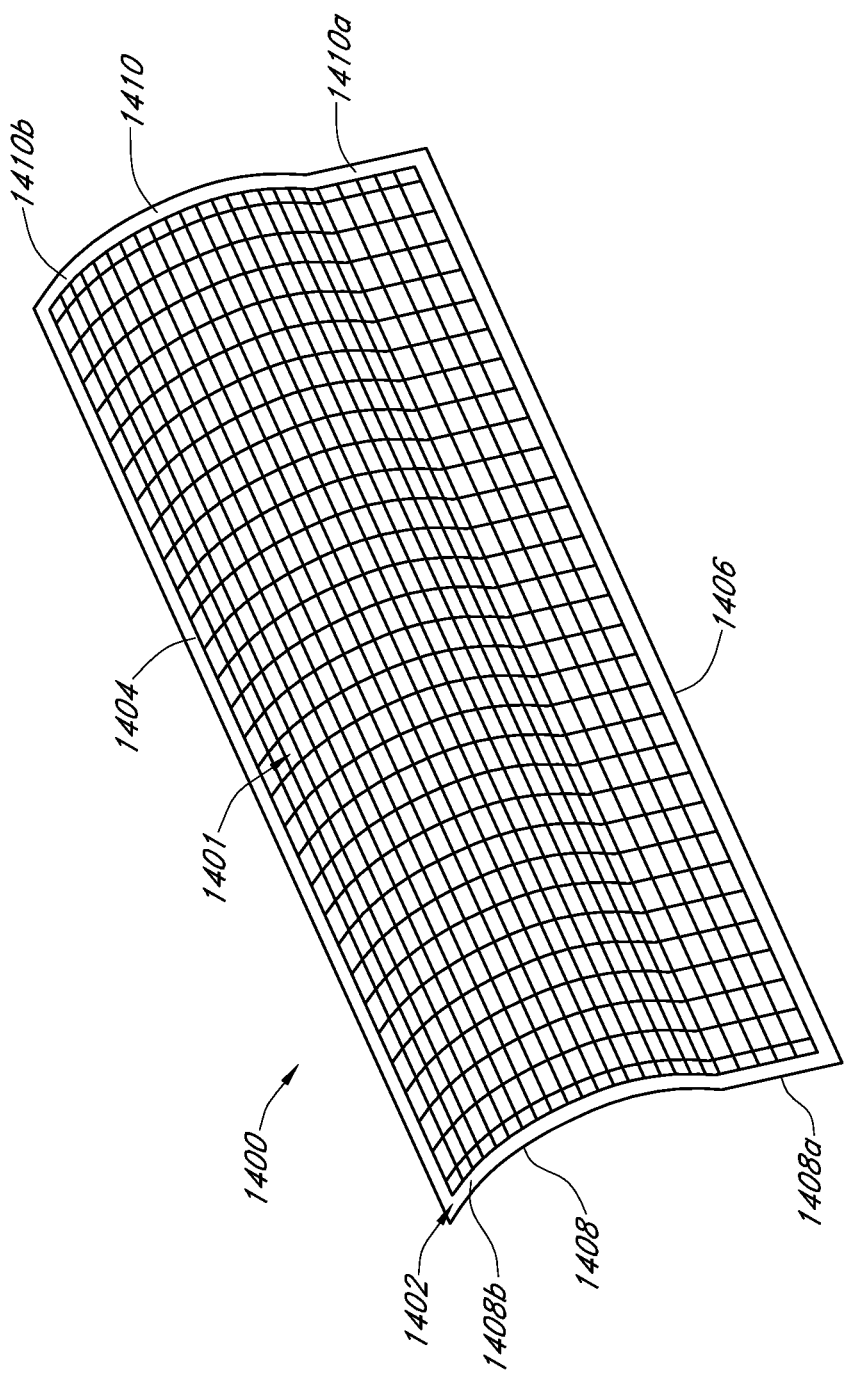
FIG. 14 illustrates a mesh screen of a micro mass airflow collection equipment unit, according to one embodiment.

FIG. 14 illustrates a mesh screen of a micro mass airflow collection equipment unit, according to one embodiment. The mesh screen 1400 may include a wire mesh 1401 surrounded by an outer frame 1402 having an upper wall 1404 and a lower wall 1406 parallel to the upper wall 1404 and connected to a first side wall 1408 and a second side wall 1410, the first side wall 1408 parallel to the second side wall 1410. The first and second side walls 1408, 1410 may comprise lower portions 1408a, 1410a, respectively, integrally connected to upper portions 1408b, 1410b. According to one embodiment, the lower portions 1408a, 1410a may extend upwardly and inwardly to the upper portions 1408b, 1410b, respectively. The upper portions 1408b, 1410b may extend upwardly in a curved configuration to the upper wall 1404.

First Example

According to one example, an initial assessment of the electrical energy potential of the mass airflow in a tunnel was recorded over 200 Train Initiated Events (TIEs) during a 48-hour period with an average mass airflow speed of 44.8 miles per hour. The usable average duration of the TIE was 81 seconds. Records show that approximately 11,000,000 kilowatt hours of electricity were used annually in the segment of subway tunnel being tested.

During the approximately 48 hour period during which it was installed, the monitoring equipment collected data generated by a total of 207 TIEs. As described above, the average wind speed for all 207 TIEs for the combined two day period in miles per hour ("MPH") was 44.8 MPH, with the highest recorded speed per TIE being 67.3 MPH and the lowest recorded speed being 33.8 MPH.

In addition to recording the wind speed of each TIE, the monitoring equipment also recorded the millivolt signal generated by each TIE. The average millivolts for all 207 TIEs for the total combined two day period was 244 Mv, with the highest recorded reading per TIE being 346 Mv and the lowest recorded reading being 169 Mv.

The 207 TIEs ranged in duration from a shortest of 96 seconds to a longest of 120 seconds, with the average duration being 99 seconds. However, since the portion of the TIE generating mass airflow at less than 10 MPH would most likely not be usable for power generation, the usable average event duration is actually 81 seconds.

Second Example

As described above, the MACE units may be placed in the tunnel to capture the mass air flow generated by trains passing through the tunnels and converting it to energy, such as electrical power. Once captured, the mass airflow energy can be transferred to a battery storage system located in available space in the tunnel in order to convert the intermittent renewable power generated by the trains into a predictable and consistent energy source.

Once the mass airflow energy is captured, it could be transferred to a battery storage system. Each TIE consists of an extremely energetic 60-90 second event at a given point in the tunnel, followed by an average lull of 10-12 minutes before the next train approaches and passes. The purpose of the battery storage system would be to hold and convert the intermittent TIE energy into a more consistent energy flow which used to offset a substantial amount of the fossil fuel based electrical energy which the train operator is currently required to purchase from third parties.

The system described above adapts to create a source of renewable energy in a previously untapped environment (the tunnel). Unlike traditional renewable energy resources, this new resource will not involve any negative environmental or habitat impacts. While it might use current state of the art battery storage system technology, the interface of that technology with the adapted method of capturing and utilizing the mass air flow created by the passing trains results in a totally new and unique energy source.

One or more of the components and functions illustrated in the FIGS. may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention may not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A system for generating renewable energy from subterranean mass airflow power, comprising:

a plurality of horizontal axis rotors attached at spaced intervals along an elongated drive shaft for harnessing the subterranean mass airflow power;

one or more mounting brackets for mounting to a surface wall in an underground tunnel, the elongated drive shaft secured to the one or more mounting brackets, each mounting bracket comprises, an upper plate integrally connected to an inner surface of the one or more mounting brackets and extending along a diameter of the circular support member, the upper plate parallel to the base plate;

a circular support member secured to a base plate by a pair of side members extending upwardly from the base plate to the circular support member, the pair of side members of each mounting bracket of the one or more mounting brackets comprise:

a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate;

a generator secured to at least one end of the elongated drive shaft for converting the subterranean mass airflow power to energy.

2. The system of claim 1, further comprising:

one or more ball bearings mounted to the one or more mounting brackets, the elongated drive shaft extending through the one or more ball bearings.

3. The system of claim 1, further comprising:

a first elongated member secured to the first bottom bracket member of each of the one or more mounting brackets; and a second elongated member secured to the second bottom bracket member of the each of the one or more mounting brackets;

wherein the first and second elongated members are affixed to the surface wall in the underground tunnel.

4. The system of claim 1, further comprising:

a first plurality of mesh screens secured to a first side portion of the circular support member of the each one of the one more mounting brackets; and a second plurality of mesh screens secured to a second side portion of the circular support member of the each one of the one more mounting brackets; and wherein the first side portion is a mirror image of the second side portion.

5. A system for generating renewable energy from subterranean mass airflow power, comprising:

a first plurality of mounting brackets for mounting to a surface wall in an underground tunnel, each mounting bracket in the first plurality of mounting brackets comprising a circular support member secured to a base plate by a pair of side members extending upwardly from the base plate to the circular support member, an upper plate integrally connected to an inner surface of each mounting bracket in the plurality of mounting brackets, and the pair of side members of each mounting bracket in the first plurality of mounting brackets comprise:

a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate; and a second plurality of mounting brackets for mounting to the surface wall in the underground tunnel, the first plurality of mounting brackets different from the second plurality of mounting brackets;

a plurality of horizontal axis rotors attached at spaced intervals along an elongated drive shaft for harnessing the subterranean mass airflow power, the elongated drive shaft secured to the first plurality of mounting brackets and the second plurality of mounting brackets; and a generator secured to at least one end of the elongated drive shaft for converting the subterranean mass airflow power to energy.

6. The system of claim 5, wherein the upper plate extends along a diameter of the circular support member, the upper plate parallel to the base plate.

7. The system of claim 6, further comprising:

a first elongated member secured to the first bottom bracket member of the each of the mounting brackets in the first plurality of mounting brackets; and a second elongated member secured to the second bottom bracket member of the each of the mounting brackets in the first plurality of mounting brackets;

wherein the first and second elongated members are affixed to the surface wall in the underground tunnel.

8. The system of claim 6, wherein each mounting bracket in the second plurality of mounting brackets comprise:

a base plate having a first end and a second end;

an upper plate, having a first upper end and a second upper end, parallel to the base plate;

a first side member, having a first inner surface and a first outer surface, integrally connected to and extending upwardly from the first end of the base plate to the first upper end of the upper plate; and a second side member, having a second inner surface and a second outer surface, integrally connected to and extending upwardly from the second end of the base plate to the second upper end of the upper plate.

9. The system of claim 6, wherein the each mounting bracket in the second plurality of mounting brackets comprise:

a third side bracket having a third side bracket member and a third bottom bracket member, the third bottom bracket member integrally connected to and extending outward from the third side bracket member, and where the third side bracket member of the third side bracket is connected to the outer surface of the third side member below the upper plate; and a fourth side bracket having a fourth side bracket member and a fourth bottom bracket member, the fourth bottom bracket member integrally connected to and extending outward from the fourth side bracket member, and where the fourth side bracket member of the fourth side bracket is connected to the outer surface of the fourth side member below the upper plate.

10. The system of claim 9, further comprising:
a first elongated member secured to the third bottom bracket member of the each of the mounting brackets in the second plurality of mounting brackets; and
a second elongated member secured to the fourth bottom bracket member of the each of the mounting brackets in the second plurality of mounting brackets; and
wherein the first and second elongated members are affixed to the surface wall in the underground tunnel.

11. A system for generating renewable energy from subterranean mass airflow power, comprising:
a first plurality of mounting brackets for mounting to a surface wall in an underground tunnel, each mounting bracket in the first plurality of mounting brackets comprise:
 a first base plate having a first end and a second end;
 a support member, having a first side portion and a second side portion, fixedly secured to and extending upwardly from the base plate;
 a first side member, having a first inner surface and a first outer surface, integrally connected to and extending upwardly from the first end of the base plate to the first side portion of the support member;
 a second side member, having a second inner surface and a second outer surface, integrally connected to and extending upwardly from the second end of the base plate to the second side portion of the support member; and
 a first upper plate parallel to the base plate and integrally connected to the first side portion of the support member and the second side portion of the support member; and
a second plurality of mounting brackets for mounting to the surface wall in the underground tunnel, the first plurality of mounting brackets different than the second plurality of mounting brackets, each mounting bracket in the second plurality of mounting brackets comprise:
 a second base plate having a first end and a second end;
 a second upper plate, having a first upper end and a second upper end, parallel to the second base plate;
 a third side member, having a third inner surface and a third outer surface, integrally connected to and extending upwardly from the first end of the second base plate to the first upper end of the second upper plate; and
 a fourth side member, having a fourth inner surface and a fourth outer surface, integrally connected to and extending upwardly from the first end of the second base plate to the second upper end of the second upper plate; and a plurality of horizontal axis rotors attached at spaced intervals along an elongated drive shaft for harnessing the subterranean mass airflow power, the elongated drive shaft secured to the first upper plate of the first plurality of mounting brackets and the second upper plate of the second plurality of mounting brackets; and
a generator secured to at least one end of the elongated drive shaft for converting the subterranean mass airflow power to energy.

12. The system of claim 11, wherein the each mounting bracket in the first plurality of mounting brackets comprise:
a first side bracket having a first side bracket member and a first bottom bracket member, the first bottom bracket member integrally connected to and extending outward from the first side bracket member, and where the first side bracket member of the first side bracket is connected to the outer surface of the first side member below the upper plate; and
a second side bracket having a second side bracket member and a second bottom bracket member, the second bottom bracket member integrally connected to and extending outward from the second side bracket member, and where the second side bracket member of the second side bracket is connected to the outer surface of the second side member below the upper plate; and
wherein the each mounting bracket of the second plurality of mounting brackets comprise:
a third side bracket having a third side bracket member and a third bottom bracket member, the third bottom bracket member integrally connected to and extending outward from the third side bracket member, and where the third side bracket member of the third side bracket is connected to the outer surface of the third side member below the upper plate; and
a fourth side bracket having a fourth side bracket member and a fourth bottom bracket member, the fourth bottom bracket member integrally connected to and extending outward from the fourth side bracket member, and where the fourth side bracket member of the fourth side bracket is connected to the outer surface of the fourth side member below the upper plate.

13. The system of claim 12, further comprising:
a first elongated member secured to the first bottom bracket member of the each of the mounting brackets in the first plurality of mounting brackets and the third bottom bracket member of the each of the mounting brackets in the second plurality of mounting brackets; and
a second elongated member secured to the second bottom bracket member of the each of the mounting brackets in the first plurality of mounting brackets and the fourth bottom bracket member of the each mounting bracket of the second plurality of mounting brackets; and
wherein the first and second elongated members are affixed to the surface wall in the underground tunnel.

* * * * *